United States Patent [19]

Kalmus

[11] Patent Number: 5,303,944
[45] Date of Patent: Apr. 19, 1994

[54] BICYCLE RIDING TRAINING DEVICE

[76] Inventor: Allan L. Kalmus, 29424 Shenandoah, Farmington Hills, Mich. 48331

[21] Appl. No.: 26,543

[22] Filed: Mar. 4, 1993

[51] Int. Cl.⁵ .................... B62K 9/00; B62K 19/30
[52] U.S. Cl. .................... 280/288.4; 280/293; 403/306; 403/308; 403/349; 403/377
[58] Field of Search .......... 280/293, 288.4, 273; 74/551.8, 551.2, 502.2; 403/349, 348, 377, 306, 308, 97, 79

[56] References Cited

U.S. PATENT DOCUMENTS

| 2,316,436 | 4/1943 | Kalter | 403/79 |
|---|---|---|---|
| 3,650,544 | 3/1972 | Cassell | 280/293 |
| 4,518,162 | 5/1985 | Oates | 403/349 |
| 4,903,975 | 2/1990 | Weisbrodt et al. | 280/293 |
| 4,917,398 | 4/1990 | Pinto | 280/293 |

FOREIGN PATENT DOCUMENTS

| 2512767 | 3/1983 | France | 280/293 |
|---|---|---|---|
| 2668744 | 5/1992 | France | 280/288.4 |
| 1272304 | 4/1972 | United Kingdom . | |

*Primary Examiner*—Mitchell J. Hill
*Attorney, Agent, or Firm*—Weintraub, DuRoss & Brady

[57] ABSTRACT

A bicycle riding training device or handle which is attachable to a bicycle and which can be easily adjusted and portion removed and reattached after being secured to the bicycle. A clamping portion is attached to the bicycle and a handle portion is locked into the clamping portion or unlocked from the clamping portion when it is no longer needed.

8 Claims, 2 Drawing Sheets

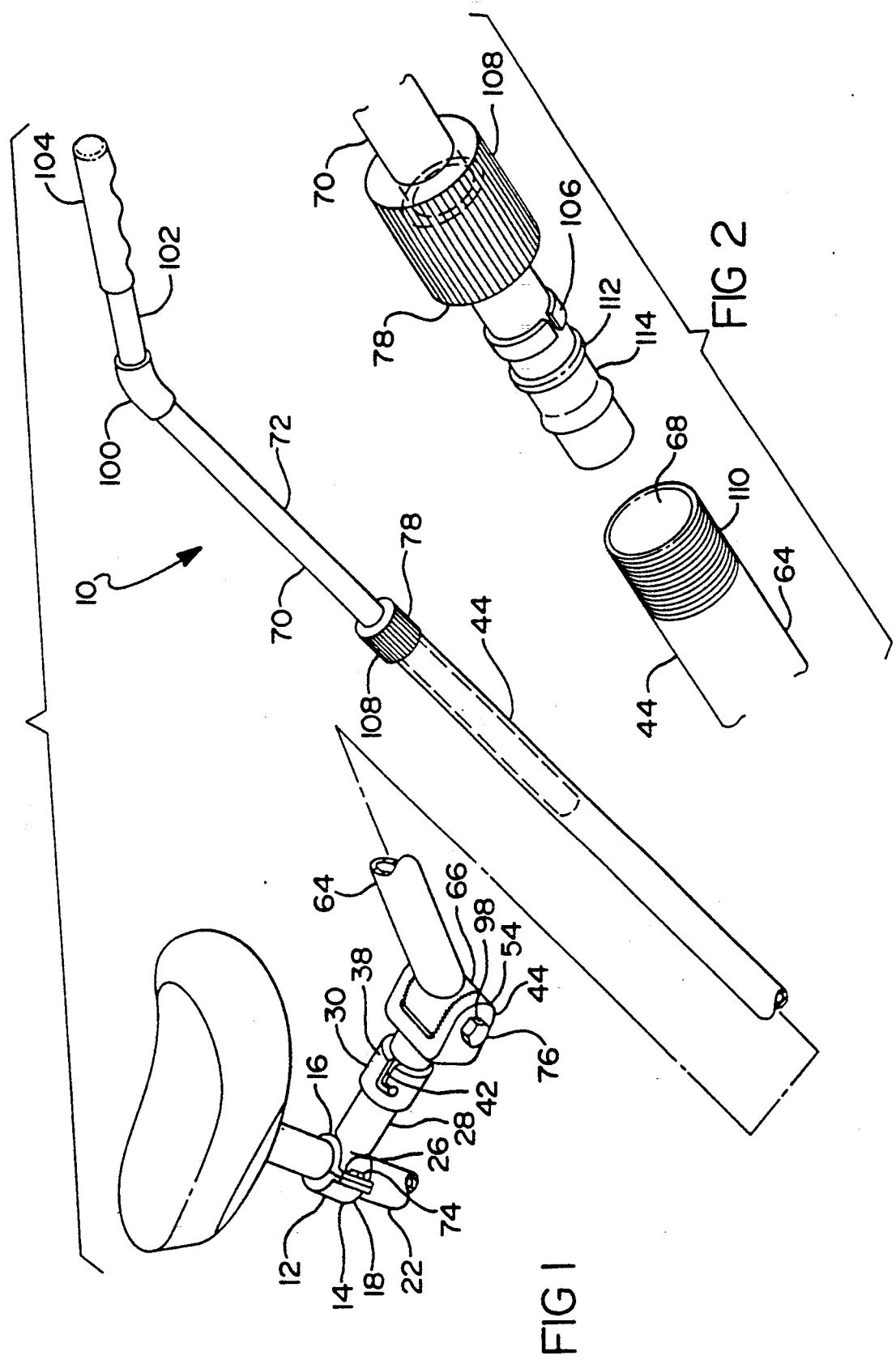

BICYCLE RIDING TRAINING DEVICE

BACKGROUND OF THE INVENTION

1. Field of Invention

This present invention relates to devices to aid in the training of bicycle riders. More particularly, the present invention concerns support bars mounted to a bicycle.

2. Description of Prior Art

Devices to assist novice bicycle riders during their learning process have been in existence for several years. The most commonly known training device comprises the mounting of additional wheels to the rear axle of the bicycle, one or more wheels on each side. This device is commonly termed "training wheels."

Another training device comprises a bar attached to the rear portion of the bicycle. The bar is attached to either the rear axle or the frame near the axle. The bar extends upwardly and rearwardly therefrom, such that the bar may be grasped by an adult or other instructor to steady the rider or even to propel the device. These devices are usually non-adjustable and remain in one position after installation.

Typical of the bar type of training devices is French Patent No. 2,512,767, issued to Pruszinski on Mar. 3, 1983. Pruszinski teaches a handle for assisting bicycle riders having a tubular bar inserted into a receptacle permanently attached to the frame of the bicycle proximate the rear axle thereof. The bar is fastened into the receptacle, normal to the riding surface. Pruszinski does not teach any means for adjusting the orientation of the bar.

Another example of the bar training devices is U.S. Pat. No. 4,917,398, which issued to de Miranda Pinto on Apr. 17, 1990. de Miranda Pinto teaches a bar having a clevis formed at the lower end thereof. The clevis portion of the bar is attached to the rear axle of the bicycle. The instructor can then grasp the bar to support the rider or propel the bicycle. The device of de Miranda Pinto may be adjusted pivotally at its attachment to the axle. This adjustment is not, however, achieved unless the nuts fixing the position of the bar are loosened.

These types of devices suffer from limitations of the positioning of and length of the bar. Additionally, the devices known attach at the rear axle or the frame proximate the rear axle. This does not, however, allow an instructor to easily aid in supporting the rider. A more appropriate selection for attachment would improve the support of the rider.

Further, the known devices offer little flexibility in angular deployment or in the length of the bar. To allow the bar to be altered to the particularly physical attributes of the instructor would greatly aid in his or her effectiveness in supporting the riders.

Finally, a device which can be easily deployed or removed from a bicycle, such that riders of differing skills could use the bicycle, would give greater utilization to a bicycle having such a training device. It is to all of these goals that the present invention is directed.

SUMMARY OF THE PRESENT INVENTION

The present invention addresses the above problems. The present invention is a device attachable to a bicycle seat assembly to allow support to be given to a rider seated upon the bicycle seat, assembly the device comprising:

(a) means for attaching the device to the bicycle seat; and (b) a handle releasably attachable to the means for attaching.

The handle comprises a shaft portion having a forward end and a rearward end, the forward end being releasably connected to the means for attaching, and a gripping portion connected to the shaft portion.

The handle may further comprise means for altering the length of the gripping portion which, in a preferred embodiment, may comprise:

(1) a seating ring slidably disposed on the handle to adjust the length thereof;

(2) a lock ring slidably disposed on the handle proximate the seating ring;

(3) a locking cap circumferentially disposed around the outer surface of the gripping portion, the locking cap having a threading formed on the interior surface thereof; and wherein the shaft portion has a threading formed thereon at the rearward end thereof and which threadingly engages the locking cap, the gripping portion being telescopingly projectable into the shaft portion, the seating ring being insertable into the shaft portion and engagable with the inner surface of the shaft portion, and further wherein the locking cap threadingly engages the shaft portion over the lock ring, such that the lock ring and locking cap cooperate in conjunction with the seating ring to adjust the length of the gripping portion to the desired length.

The device may further comprise a clevis interposed the means for attaching and the shaft portion of the handle, the clevis having a base portion and two arm portions, the clevis being connected to the means for attaching, the arm portions having colinear perforations formed therein, the shaft portion being disposed between the arm portions and comprising a knuckle formed at the forward end thereof, the knuckle having a bore formed therethrough, and a pin projecting through the perforations and the bore such that the shaft portion is pivotally connected to the means for attaching.

The knuckle has a plurality of ridges formed thereon and the arms of the clevis have corresponding ridges formed on the inside surfaces thereof, the ridges of the arms and the knuckle cooperating to fix the position of the shaft portion relative to the means for attaching, the pin securing the shaft to the clevis.

The device may further comprise means for releasably joining the clevis to the means for attaching, which may comprise a receiving member having an outer surface defining an interior, the member having an L-shaped slot formed in the outer surface; and a projecting member which fits within the interior, and having a pin formed on the surface thereof, the pin passing through the L-shaped slot and wherein the pin and slot cooperating to interlock the receiving member and the projecting member.

The present invention will be better understood with reference the following detailed discussion and to the accompanying drawings, in which like reference numerals refer to like elements and in which:

BRIEF DESCRIPTION OF DRAWINGS

FIG. 1 is a perspective view of the invention;

FIG. 2 is an exploded perspective view of the shaft portion and the gripping portion of the handle of the present invention.

DETAILED DESCRIPTION OF THE INVENTION

Figure 3:
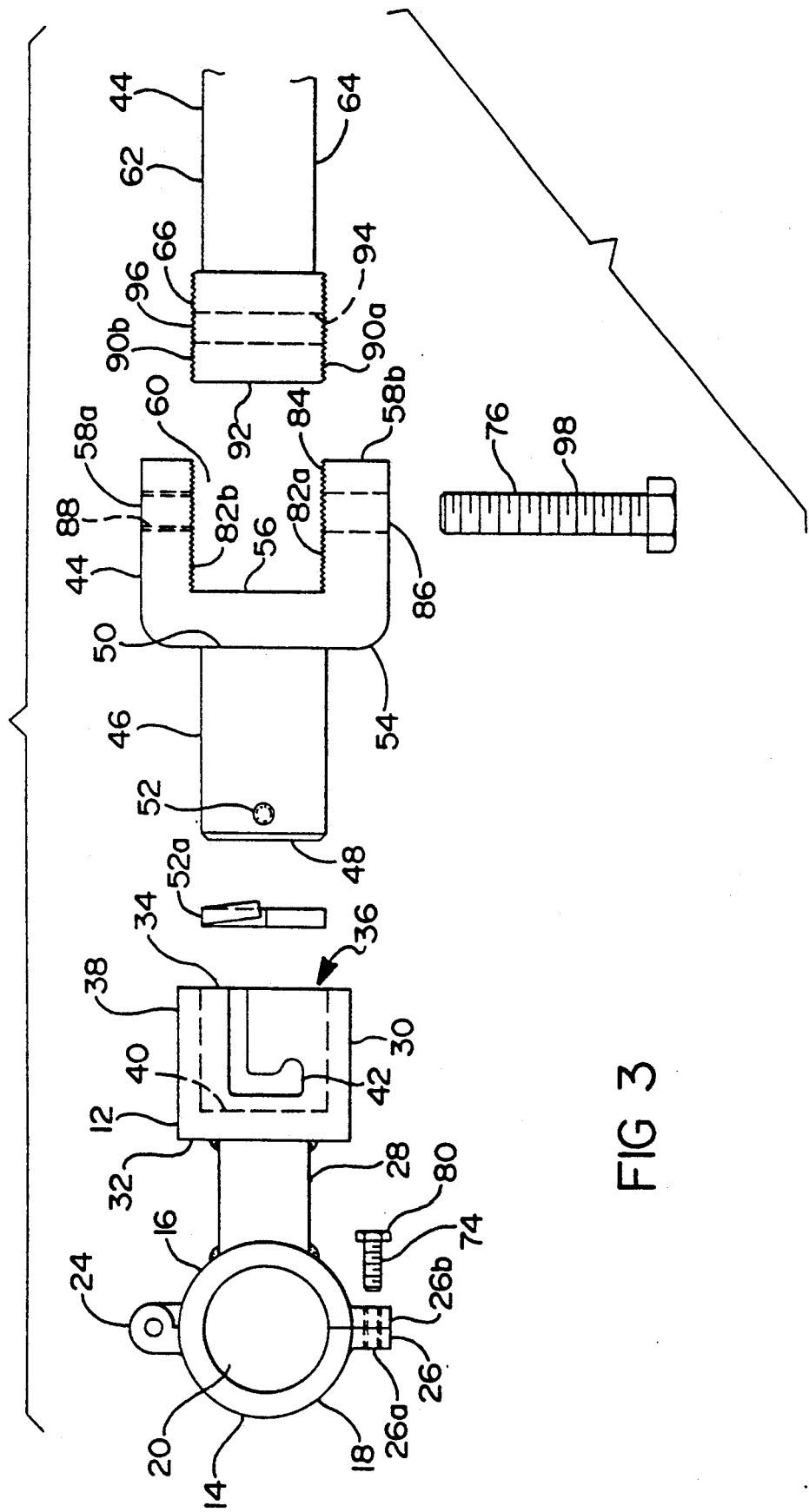
FIG. 3 is an exploded top view of the present invention.

Now with reference to the drawings, FIGS. 1-3, there is depicted therein the present invention, to wit, a device 10 to aid in the training of bicycle riders. The device 10 comprises means 12 for attaching the device 10 to a bicycle seat assembly 5 and a handle 14 releasably attachable to the means 12 for attaching.

The device 10 attaches to a bicycle seat assembly 5, as shown in FIG. 1. For purposes of this description, the bicycle seat assembly 5 comprises a seat 6 and a support bar 7 upon which the seat 6 is mounted. The means 12 for attaching, as shown in FIG. 1, is attached to the support bar 7. However, the means 12 for attaching may be attached to the seat 6 by suitable means, such as a clip disposable through a slot formed in the seat (not shown).

In the preferred embodiment shown in FIGS. 1 and 3, the means 12 for attaching comprises a clamp 13 having a tubular portion slidably disposed around the support bar 7. The clamp 13 has a seat arm 16 and a hinge arm 18 which define a bore through which the bar 7 is passes through. A hinge 24 pivotally joins the seat arm 16 and the hinge arm 18. A fastening flange 26, comprising a first flange 26a formed on the hinge arm 18 and a second flange 26b formed to the seat arm 16. Colinear apertures are formed in the flange portions 26a, 26b, such that a fastener 74 having a head 80 may fit therethrough. The fastener 74 affixes the means 12 to the seat 5 such that it is releasably held in a desired position. The fastener 74 may comprise a bolt, a rivet or a pin, as are commonly known.

The present invention may simply comprise, in a less preferred embodiment, the handle 14 connected at this point to the means 12 for attaching. As shown in FIGS. 1 and 3, the preferred embodiment further comprises a middle portion 28 formed to the hinge arm 18. A receiving portion 30 is integrally formed to the middle portion 28. The receiving portion 30 is a tubular member having an outer surface 38 defining an interior 36. The outer surface 38 has formed therein an L-shaped slot 42. The slot 42 cooperates with a pin to interlock the receiving member with a protruding member, as described in detailed herein below.

The means 12 for attaching, the middle portion 28 and receiving member 30, and all components thereof, are formed of steel preferably. Alternate materials, such as high-strength plastics or other metals, such as aluminum, may be elected so long as they provide the strength necessary to endure the stress placed thereon by the instructor or adult utilizing the device 10.

A clevis 54 is formed integrally with the protruding portion 46. The clevis 54 has a base portion 50 and two arm portions 58a and 58b. The protruding portion 46 is formed at the base portion 50. The protruding member 54 has a pin 52 formed thereon. When the forward end 48 of the protruding member 46 is placed into the interior 36 of the receiving member 30, the pin 52 is slidably disposed within the L-shaped slot 42. When the pin 52 is fully deployed into the slot 42, the protruding member 46 is rotated, such that the pin 52 is laterally moved in the slot 42. The protruding member 46 is then pulled slightly rearwardly. This effects the interlocking of the clevis 54 with the means 12 for attaching and, with the attachment of the handle 14 to clevis 54, as detailed herein below, the connection of the handle 14 to the means 12 for attaching.

The clevis 54 has colinear perforations 86, 88 formed in the arm portions 58b, 58a respectively. The arm portions 58a, 58b cooperate with the base portion 50 to define an interior or cleavage 60. Along the inner surfaces of the arm portions 58a, 58b are formed a plurality of ridges 82b, 82a there along respectively. The clevis receives into the interior thereof a knuckle to effect connection of the handle 14 thereto and to effect an incrementally, universally rotatable relationship between the handle 14 and the clevis 54, as will be described in further detail herein below.

The handle 14 comprises a shaft portion 44 and a gripping portion 70. Both the shaft portion 44 and the gripping portion 70 are formed suitably strong materials, such as steel, aluminum or other metal, or alternately a high-strength plastic.

The shaft portion 44 has a forward end and a rearward end. A knuckle 66 is disposed on the forward end of the shaft portion 44. The knuckle 66 is a substantially cylindrical member having side walls 90a and 90b. The walls 90a, 90b have ridges formed thereon. A bore 84 is formed therethrough the knuckle 66. When deployed within the interior 60 of the clevis 54, the ridges of the arms 82a, 82b interdigitate with the side walls 90a, 90b. By this interdigitation, the handle 14 may be angularly adjusted relative to the means 12 for attaching.

To effect attachment of the knuckle 66 to the clevis 54, a fastener 98, having a pin 76 and a head 77, is deployed through the perforations 86, 88 and the bore 96, when the bore 96 is axially aligned with the perforations 86, 88. The fastener 98 may be tightened or loosened, to secure or release a position, as desired. By these structures, the present invention gives a handle 14 that is disposable at an angle that is comfortable to use for adults of varying heights. This is an improvement of the present invention over the art of record.

Referring now to FIG. 2, the shaft 44 has threadings 110 disposed at the rearward end thereof. The inside 68 of the shaft portion 44 receives therein the gripping portion 70. The gripping portion has a raised circumference 114 to help guide the gripping portion 70 as it telescopes within the shaft portion 44. A seating ring 112 is slidably disposed upon the gripping portion 70. The seating ring 112, formed of rubber or other suitable material, is set at the point of furthest insertion of the gripping portion 70 into the shaft portion 44. By this means, the length of the gripping portion 70, and therefore the handle 14, can effectively be changed, an advantage over the art of record.

A locking ring 106 is slidably disposed on the handle proximate the seating ring 112. The locking ring 106 is somewhat rearwardly set from the seating ring 112 so that it is outside of the shaft portion 44. As described herein below, the locking ring 106 cooperates with the locking cap to effect a snug fit and connection of the gripping portion 70 and the shaft portion.

A locking cap 78 having knurles 108 formed on the outer surface thereof is slidably deployed circumferentially around the gripping portion 70. The cap 78 has threadings (not shown) formed thereon the inside surface. The threadings correspond to the threadings 110 on the shaft portion 44. The cap 78 is placed over the locking ring 106 and then screwed and threadingly engaged with the shaft portion 44. This produces a snug and secure connection of the gripping portion 70 and the shaft portion 44.

The gripping portion 70 further comprises, as shown in FIG. 1, an elbow 100. The elbow 100 is curved such that an intermediate member 102 having a grip 104 deployed thereon. It is understood that the gripping could be one integral piece without subdivision to the elbow 100 and intermediate piece 102.

In use, the means 12 for attaching are secured to the support bar 7. The protruding member may then be inserted into the receiving member and interlocked thereto by running the pin through the L-shaped slot. The clevis attached thereto receives and has attached thereto the knuckle attached to the handle 14. A fastener 98 pivotally connects the clevis and the knuckle and effects an incrementally universally rotatable connection. The gripping portion is telescopingly connected to the shaft portion, thus offering a handle of varying length. Thus, the device of the present invention is angularly adjustable, has a handle of varying length and is easily detachable from the bicycle.

It is noted that the receiving member can be eliminated, such that the protruding member is formed directly to the means for attaching in a less preferred embodiment. Alternately, a fixed-length handle could be deployed or a simple pivotal connection between the clevis and the handle can be used in restricted forms of the present invention.

Having, thus, described the present invention, what is claimed is:

1. A device attachable to a bicycle seat assembly to support a rider seated thereupon the bicycle seat assembly, the device comprising:
   (a) means for attaching the device to the bicycle seat assembly;
   (b) a handle of an adjustable length releasably attachable to the means for attaching the device, the handle comprising:
      (i) a shaft portion having a forward end and a rearward end, the forward end being releasably connected to the means for attaching the device; and
      (ii) a gripping portion connected to the rearward end of the shaft portion;
   (c) means for altering the length of the handle, the means for altering comprising:
      (i) a seating ring slidably disposed on the gripper portion for adjusting the length of the handle;
      (ii) a lock ring slidably disposed on the gripping portion proximate the seating ring;
      (iii) a locking cap circumferentially disposed around an outer surface of the gripping portion, the locking cap having a threading formed on an interior surface thereof;
   wherein the shaft portion has a threading formed thereon at the rearward end thereof which threadingly engages the locking cap, the gripping portion being telescopingly projectable into the shaft portion, the seating ring being insertable into the shaft portion and engagable with an inner surface of the shaft portion; and
   further wherein the locking cap threadingly engages the shaft portion over the lock ring, such that the lock ring and locking cap cooperate in conjunction with the seating ring to adjust the length of the gripping portion to a desired length.

2. The device as set forth in claim 1, further comprising:
   (a) a clevis interposed the means for attaching and the shaft portion of the handle, the clevis having a base portion and two arm portions, the clevis being connected to the means for attaching, the arm portions having colinear perforations formed therein, the shaft portion being disposed between the arm portions and comprising a knuckle formed at the forward end thereof, the knuckle having a bore formed therethrough; and
   (b) a pin projecting through the perforations and the bore such that the shaft portion is pivotally connected to the means for attaching.

3. The device as set forth in claim 2, wherein the knuckle has a plurality of ridges formed thereon and the arms of the clevis have corresponding ridges formed on the inside surfaces thereof, the ridges of the arms and the knuckle cooperating to fix the position of the shaft portion relative to the means for attaching, the pin securing the shaft to the clevis.

4. The device as set forth in claim 2, further comprising:
   means for releasably joining the clevis to the means for attaching.

5. The device as set forth in claim 4, the means for releasably joining comprising:
   (a) a receiving member having an outer surface defining an interior, the member having an L-shaped slot formed in the outer surface; and
   (b) a projecting member which fits within the interior, and having a pin formed on the surface thereof, the pin passing through the L-shaped slot and wherein the pin and slot cooperating to interlock the receiving member and the projecting member.

6. The device as set forth in claim 5, further comprising a washer deployed upon the projecting member.

7. The device as set forth in claim 1, further comprising means for incrementally, universally rotatably connecting the shaft portion to the means for attaching.

8. A device attachable to a bicycle seat assembly having a seating portion and a support to allow support to be given to a rider seated upon the bicycle seat, the device comprising:
   (a) an attaching member comprising a tubular portion slidably mounted to the seat support, the attaching member having a fastener disposed with the tubular portion to affix the attaching member at a desired position, the attaching member further having an extending portion integral with the tubular portion and extending rearwardly therefrom;
   (b) a tubular receiving member integrally formed with the extending portion, the receiving member having an L-shaped slot formed therein and defining an interior;
   (c) a tubular projecting member having a pin formed on an outer surface thereof, the projecting member telescoping into the interior of the receiving member, the pin passing into the slot of the receiving member so that the receiving member and the projecting member are interlocked;
   (d) a clevis having a base portion and two arm portions having interior and exterior surfaces, the base portion and arm portions defining a interior, the base portions being integrally formed with the projecting member, the arm portions having colinear perforation formed therethrough, the interior surfaces having a plurality of ridges formed thereon;
   (e) a handle comprising:
      (1) a tubular shaft portion having a knuckle disposed at a forward end thereof, the knuckle having a bore formed therethrough and ridges formed along the sides thereof, wherein the knuckle is disposed within the clevis, the ridges of the arm portions and the ridges of the knuckle interdigitating to create a fixed relationship between the shaft portion and the clevis, the shaft portion having threadings formed proximate a rearward end thereof;

(2) a gripping portion, the gripping portion being telescopable into the shaft portion;

(3) a seating ring deployed around the outer surface of the gripping portion to seat the gripping portion relative to the shaft portion at a desired length;

(4) a locking ring deployed rearwardly of the seating ring around the gripping portion;

(5) a locking cap having a tubular portion and a circular flange member formed to the tubular portion, the cap having a threading formed upon the interior surface of the tubular portion, the cap threading corresponding to the threading upon the shaft portion, the cap being disposed over the locking ring and onto the rearward end of the shaft portion, the cap and the shaft portion being threadingly connected such that the gripping portion and the shaft portion are fixedly attached; and (f) a pin disposed through the clevis and the knuckle to pivotally mounted the knuckle to the clevis, the pin being tightenable so as to releasably fix the orientation of the knuckle to the clevis.

* * * * *